United States Patent [19]

Crescentini et al.

[11] 4,108,922
[45] Aug. 22, 1978

[54] ANTISTATIC FIBER CONTAINING MULTIPLE BRANCHED PROPOXYLATED-ETHOXYLATED POLYALKYLENEPOLYAMINES AND MONOAMINES AND THEIR CHAIN-EXTENDED REACTION PRODUCTS

[75] Inventors: Lamberto Crescentini, Chester; Gene Clyde Weedon, Richmond; Rodney Lee Wells, Chester, all of Va.

[73] Assignee: Allied Chemical Corporation, Morris Township, Morris County, N.J.

[21] Appl. No.: 294,971

[22] Filed: Oct. 11, 1972

Related U.S. Application Data

[63] Continuation-in-part of Ser. No. 193,567, Oct. 28, 1971, abandoned, and a continuation-in-part of Ser. No. 239,905, Mar. 31, 1972, abandoned, said Ser. No. 239,905, is a continuation-in-part of Ser. No. 185,816, Oct. 1, 1971, abandoned.

[51] Int. Cl.² .................. C08L 63/00; C08L 77/00
[52] U.S. Cl. ................... 260/830 P; 260/823; 260/830 S; 260/857 PE; 260/857 PG; 260/858; 260/860; 528/407; 528/111; 528/123; 528/118; 528/124; 528/119; 528/341; 528/361
[58] Field of Search .................. 260/83 P, 857 PG

[56] References Cited

U.S. PATENT DOCUMENTS 3,657,366  4/1972  Weedon .................. 260/857 PG

*Primary Examiner*—Paul Lieberman
*Attorney, Agent, or Firm*—Richard A. Anderson

[57] ABSTRACT

A new composition has been found comprising an antistatic fiber selected from the group consisting of polyamide, polyester, polyurea, polyurethane, or polysulfonamide, said fiber containing between about one percent and about twelve percent by weight of at least one compound having a molecular weight above 1500 selected from the group consisting of compounds represented by the formulas:

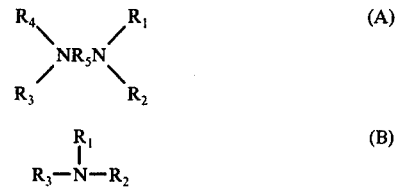

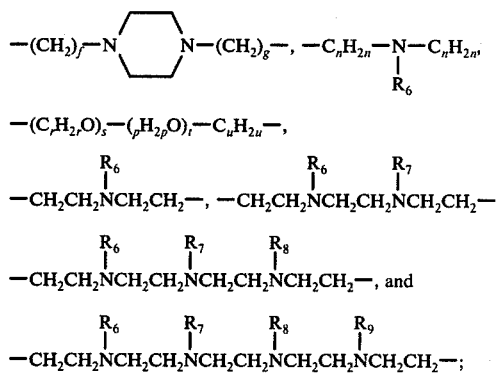

where $R_1$, $R_2$, $R_3$ and $R_4$ are independently selected from nonovalent hydrocarbon radicals having 1 to 20 carbon atoms derived from aliphatic, aromatic, cycloaliphatic, aromaticaliphatic, heterocyclic hydrocarbons or $-(C_rH_{2r}O)_m(C_pH_{2p}O)_q-H$; $R_5$ is at least one of the alkylene difunctional radicals having 2 to 15 carbon atoms and a radical selected from $$-(CH_2)_f-N\underset{\phantom{xxx}}{\overset{\phantom{xxx}}{\diagup\hspace{-6pt}\diagdown}}N-(CH_2)_g-,\ -C_nH_{2n}-\underset{R_6}{N}-C_nH_{2n},$$

$$-(C_rH_{2r}O)_s-(C_pH_{2p}O)_t-C_uH_{2u}-,$$

$$-CH_2CH_2\underset{R_6}{N}CH_2CH_2-,\ -CH_2CH_2\underset{R_6}{N}CH_2CH_2\underset{R_7}{N}CH_2CH_2-$$

$$-CH_2CH_2\underset{R_6}{N}CH_2CH_2\underset{R_7}{N}CH_2CH_2\underset{R_8}{N}CH_2CH_2-, \text{ and}$$

$$-CH_2CH_2\underset{R_6}{N}CH_2CH_2\underset{R_7}{N}CH_2CH_2\underset{R_8}{N}CH_2CH_2\underset{R_9}{N}CH_2CH_2-;$$

$R_6$, $R_7$, $R_8$ and $R_9$ are independently selected from $R_1$, $R_2$, $R_3$, $R_4$, H or another monovalent hydrocarbon radical having 1 to 20 carbon atoms as defined for $R_1$, $R_2$, $R_3$, $R_4$, provided that at least one of $R_1$, $R_2$, $R_3$, $R_4$, $R_6$, $R_7$, $R_8$, or $R_9$ is $-(C_rH_{2r})_m(C_pH_{2p}O)_q-H$, where n is 3 to 6, r, p and u are 2, 3, or 4; s, t, m, q are 0 to 100; m + q must be > 5; s and t must be < 100; f, g are 0 to 2 to 6; where j and k are each 1 to 250, and (C) the reaction product of (A) and/or (B) with a compound reactive with the end of the moiety $-(C_rH_{2r}O)_m(C_pH_{2p}O)_q-H$ yielding a difunctional chain extending radical, said reaction product being predominantly branched, the mol ratio of said chain extending compound to said compound (A) and/or (B) being from about 0.7/1.0 to 1.0/1.0.

14 Claims, No Drawings

ANTISTATIC FIBER CONTAINING MULTIPLE BRANCHED PROPOXYLATED-ETHOXYLATED POLYALKYLENEPOLYAMINES AND MONOAMINES AND THEIR CHAIN-EXTENDED REACTION PRODUCTS

REFERENCES TO RELATED APPLICATIONS

This application is a combination and continuation-in-part of two co-pending, earlier filed applications, namely U.S. Ser. No. 193,567, filed Oct. 28, 1971 and Ser. No. 239,905, filed Mar. 31, 1972, both to be abandoned after filing of this application. U.S. Ser. No. 239,905 is in turn a continuation-in-part of Ser. No. 185,816, filed Oct. 1, 1971, now abandoned. These applications are all an improvement upon the invention disclosed in U.S. Pat. No. 3,657,386, hereby incorporated by reference into this application.

SUMMARY OF THE INVENTION

An improved antistatic fiber results when at least one compound described as follows is uniformly dispersed into the polymer being spun into a fiber. The fiber-forming polymer may be polyamide, polyester, polyurea, polyurethane or polysulfonamide. An antistatic fiber is formed by incorporating into the fiber-forming polymer from about 1 to about 12 percent, preferably about 2 to about 10 percent by weight of at least one compound having a molecular weight above 1500 selected from the group consisting of compounds represented by the formulas:

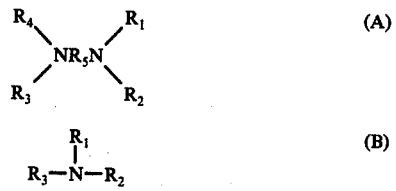

(A)

(B)

where $R_1$, $R_2$, $R_3$ and $R_4$ are independently selected from monovalent hydrocarbon radicals having 1 to 20 carbon atoms derived from aliphatic, aromatic, cycloaliphatic, aromatic-aliphatic, heterocyclic hydrocarbons or $-(C_rH_{2r}O)_m(C_pH_{2p}O)_q-H$; $R_5$ is at least one of the alkylene difunctional radicals having 2 to 15 carbon atoms and a radical selected from

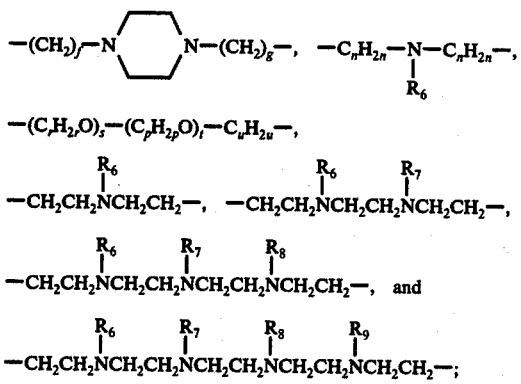

$R_6$, $R_7$, $R_8$ and $R_9$ are independently selected from $R_1$, $R_2$, $R_3$ $R_4$, H or another monovalent hydrocarbon radical having 1 to 20 carbon atoms as defined for $R_1$, $R_2$, $R_3$ and $R_4$, provided that at least one of $R_1$, $R_2$, $R_3$, $R_4$, $R_6$, $R_7$, $R_8$, or $R_9$ is $-(C_rH_{2r})_m(C_pH_{2p}O)_q-H$, but when $R_5$ is $-CH_2CH_2-$ then at least one $R_1$, $R_2$, $R_3$, or $R_4$ is not

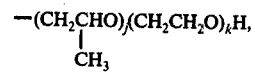

where $n$ is 3 to 6; $r$, $p$ and $u$ are 2, 3, or 4; $s$, $t$, $m$, $q$ are 0 to 100; $m + q$ must be $> 5$; $s$ and $t$ must be $< 100$; $f$, $g$ are 0 or 2 to 6; where $j$ and $k$ are each 1 to 250, and (C) the reaction product of (A) and/or (B) with a compound reactive with the end of the moiety $-(C_rH_{2r}O)_m(C_pH_{2p}O)_q-H$ yielding a difunctional chain extending radical, said reaction product being predominantly branched, the mol ratio of said chain extending compound to said compound (A) and/or (B) being from about 0.7/1.0 to 1.0/1.0.

Applicants have discovered that a superior preferred antistatic fiber results when the tetrols based on diamines are chain-extended to provide a higher molecular weight, higher viscosity compound, and added to the fiber-forming polymer. This chain-extended tetrol based on a diamine is a predominantly branched chain extended polymer of the reaction product of a tetrol compound represented by the formula

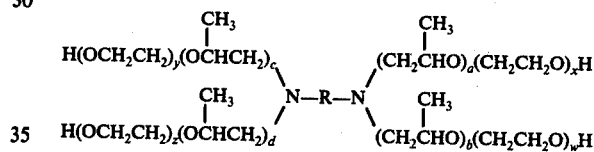

where a, b, c, d, w, x, y, and z are each a whole number and R is a difunctional radical from a hydrocarbon containing 1 to 13 carbon atoms, preferably a lower alkyl aliphatic hydrocarbon containing 1 to 6 carbon atoms, and at least one compound selected from the group consisting of diepoxides and compounds which yield the following divalent radicals:

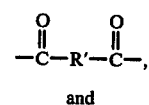

and

where R' is a difunctional radical derived from aromatic, heterocyclic, cycloaliphatic or aliphatic hydrocarbons or combinations of them. Preferably, the ethylene oxide moiety makes up 10 to 90% of the molecular weight of the tetrol compound.

The chain extended compound is added in amounts from about 1% to about 12% by weight, preferably about 2% to about 10% by weight.

The tetrol compound which is chain-extended for use as an antistatic additive in this invention is fully described in U.S. Pat. No. 2,979,528 to Lundsted, assignor to Wyandotte. These tetrol compounds are commercially available as tetronic series block copolymers having molecular weights between 1650 and over 26,000. This series varies in length of poly(oxyethylene) chain and poly(oxypropylene) chain. A 3 and 4 digit code number indicates the molecular composition. When four digits are employed, the first two explain the average molecular weight of the hydrophobe (poly(oxypropylene) branches on the alkylenediamine). When three digits are used only the first number serves this purpose. The last digit of each code number represents the weight percentage of of hydrophilic (poly(oxyethylene)) units to the nearest 10%. The tetrol compounds in the examples are described this way.

The branched, chain-extended compounds of this invention are soluble in suitable solvents such as water, benzene, or ethyl alcohol and usually melt below 75° C.

As diamines upon which the tetrols are based, in addition to ethylene diamine, diamines of a hydrocarbon containing 1 to 13 carbon atoms, preferably the lower alkyl diamines, where the lower alkyl radical contains 1–6 carbon atoms, can be used.

the polyepoxy coupled compounds can be prepared by the method taught in British Pat. No. 793,915, Example I. The other classes of compound can be similarly prepared, as in Example 10 in U.S. Pat. No. 3,009,884.

Typical of the acids and their esters to provide the chain extending difunctional radical are the dialkyl phthalic, isophthalic or terephthalic esters, such as dimethyl terephthalate and adipic, phthalic, terephthalic, sebacic, glutaric, pimelic, isocinchomeronic acids and their esters.

Typical of the polyepoxy compounds which provide the difunctional or divalent compounds, used to chain extend the tetrols basd on diamines, are those polyepoxy compounds described in British specification 793,915 to Union Carbide on page 2, line 48 to line 121 as follows:

"The organic polyepoxy compounds suitable for use in preparing the polymeric products of this invention are organic compounds having as the sole reactive groups under the conditions of this reaction, at least two epoxy groups. By this we mean to exclude compounds containing carboxyl, hydroxyl, phenolic hydroxyl, amino, amido, imido and mercapto groups, which have been found to be reactive under the conditions of this reaction with epoxy groups of the polyepoxy compound or with the hydroxyl groups and alkali metal alcoholate groups of the polyoxyalkylene glycol, and thus will interfere with the desired condensation. These polyepoxy compounds free of such interfering groups can be aliphatic, cycloaliphatic and aromatic, and can contain non-interfering substituent groups such for example as alkyl, aryl, organic ester, phosphate ester, halogen and cyano groups without interfering with the condensation. Olefinic unsaturation in the polyepoxy compound can also be present.

The preferred organic polyepoxy compounds are the aliphatic, cycloaliphatic and aryl substituted aliphatic compounds having as the sole reactive groups under the conditions of the reaction, at least two epoxy groups, and wherein oxygen is present only in oxirane, ether and ester arrangement. Particularly preferred are the diepoxy compounds consisting only of carbon, hydrogen and oxygen, wherein oxygen is present only in oxirane, ether and ester arrangement, and wherein the epoxy groups are terminal groups of an aliphatic or aryl substituted aliphatic compound or where the epoxy group or groups include adjacent carbon atoms of a cycloaliphatic ring. Representative of these preferred compounds are butadiene diepoxide, diglycidyl ether, the diglycidyl ether of 2,2-bis(4-hydroxyphenyl)-propane, 4-vinyl-cyclohexene diepoxide, dicyclopentadiene diepoxide, bis(2,3-epoxycyclopentyl)ether, ethylene glycol bis(3,4-epoxy-methylcyclohexanecarboxylate) and the 3,4-epoxy-methylcyclohexylmethyl 3,4-epoxy-methylcyclohexanecarboxylate.

It is to be understood that the invention is not limited to the foregoing compounds alone and a variety of organic polyepoxy compounds can be used. While it is preferred that the epoxy groups be terminal groups or include adjacent carbon atoms of a cycloaliphatic ring, aliphatic and substituted aliphatic compounds having adjacent carbon atoms of the epoxy group as adjacent intermediate carbon atoms of a linear chain may be used. However, compounds having such internal epoxy groups react somewhat slower compared with those compounds having terminal epoxy groups.

A mixture of two or more polyepoxy compounds can be used in the practice of this invention, or if desired, the polyoxyalkylene glycol can be reacted successively with different polyepoxy compounds to obtain these polymeric products.

These polyepoxy compounds serve both as chain extenders between polyalkylene glycol chains and as cross-linking agents. According to our experience, primary hydroxyl groups of the polyoxyalkylene glycol react preferentially with the epoxy groups to link up the polyglycol chains, creating secondary hydroxyl groups upon opening of the epoxide ring."

Also useful to form chain-extending divalent radicals are the aromatic or aliphatic diisocyanates, having a structure OCN—R'—NCO, where R' is defined as above.

The antistatic fiber of this invention may also contain conventional fiber additives such as antioxidants, stabilizers, delusterants, dyeing assists, and colorants.

The antistatic fiber of this invention may be used in any application where lower static electricity build-up is desired. For example, in fine denier continuous filament fibers for ladies' undergarments such as slips, or in heavy denier carpet fibers, either continuous or staple, to reduce static charge in carpets.

DESCRIPTION OF PREFERRED EMBODIMENTS

| | Summary of Antistatic Additive Examples | | | |
|---|---|---|---|---|
| Ex. No. | Where Added | Type Chain Extender[a] | Chain Ext./ Polyether Mol. Ratio | Melt Visc. | Percent Added |
| 1 | in lactam | DMT* | 0.7 | 1600 | 4 |
| 3 | in lactam | DMT* | 0.9 | 7500 | 4 |
| 4 | in lactam | DMT* | 1.0 | 17,500 | 4 |
| 5 | late addn. | DMT* | 0.7 | 1600 | 4 |
| 6 | late addn. | DMT* | 1.0 | 7500 | 4 |
| 7 | late addn. DMT* | 1.0 | 17,500 | 4 | |
| 8 | in lactam | DMT* | 0.9 | 7500 | 6 |
| 9 | late | DMT* | 0.9 | 7500 | 6 |
| 10 | injected | DMT* | 0.9 | 7500 | 6 |
| 11 | injected | DMT* | 0.9 | 7500 | 8 |
| 12 | in lactam | methylene bis (4-cyclohexyl isocyanate) | 0.9 | 7500 | 4 |
| 13 | in lactam | methylene bis (4-cyclohexyl isocyanate) | 0.9 | 7500 | 6 |
| 14 | injected | methylene bis (4-cyclohexyl isocyanate) | 0.9 | 7500 | 6 |
| 15 | in lactam | diglycidyl ether of 2,2-bis(4-hydroxyphenyl) propane | 0.9 | 6000 | 4 |
| 16 | in lactam | diglycidyl ether | 0.9 | 6000 | 6 |

-continued

Summary of Antistatic Additive Examples

| Ex. No. | Where Added | Type Chain Extender[a] | Chain Ext./ Polyether Mol. Ratio | Melt Visc. | Percent Added |
|---|---|---|---|---|---|
| 17 | injected | of 2,2-bis(4-hydroxyphenyl) propane diglycidyl ether of 2,2-bis(4-hydroxyphenyl) propane | 0.9 | 6000 | 6 |
| 18 | in lactam | DMT* (60% EO in polyether) | 0.9 | 8000 | 6 |
| 19 | injected | DMT* (20% EO in molecule) | 0.9 | — | 6 |
| 20 | injected | DMT* (80% EO in molecule) | 0.9 | — | 6 |
| 21 | injected (into nylon 6,6) | DMT* | 0.9 | — | 6 |

[a]Examples 1-17 polyether has 40% ethylene oxide in molecule.
*dimethyl terephthalate.

Following is a list of properties of tetrol compounds identified by tetronic numbers in the Examples.

| Tetronic | Molecular Weight | Brookfield Viscosity at 25° C (cps) | Pour Point ° C. | Melting Point, ° C. |
|---|---|---|---|---|
| 908 | 26,100 | —(solid) | — | 58 |
| 1302 | 7,800 | 1300 | 13 | liquid at R.T. |
| 1504 | 12,500 | 1570 | 18 | liquid at R.T. |
| 1506 | 20,000 | —(solid) | — | 50 |

EXAMPLE 1

A glass reactor equipped with a heater and stirrer was charged with a mixture of 1520 grams of e-caprolactam, 80 grams of aminocaproic acid, 60 grams of an antistatic additive obtained from the reaction product of Tetronic 1504 and dimethyl terephthalate in a 1 to 0.7 mol ratio. This additive is soluble in toluene, and has 1600 centipoise melt viscosity at 100° C. The mixture was then flushed with nitrogen and was stirred and heated to 255° C. over a 1 hour period at atmospheric pressure to produce a polymerization reaction. The heating and stirring was continued at atmospheric pressure under a nitrogen sweep for an additional 2.3 hours in order to complete the polymerization.

Nitrogen was then admitted to the glass reactor and a small pressure was maintained while the polymer was extruded from the glass reactor in the form of a polymer ribbon. The polymer ribbon was subsequently cooled, pelletized using a Wiley Mill, washed and then dried. The polymer was a white solid having a relative viscosity of about 55 to 60, as determined at a concentration of 11 grams of polymer in 100 ml. of 90 percent formic acid at 25° C. (ASTMD-789-62T).

The polycaproamide pellets containing the antistatic agent were melted at about 285° C. and then melt extruded under a pressure of 1500 psig through a 16-orifice spinnerette, each of the orifices having a diameter of 0.014 inch, to produce a 250 denier fiber. The fiber was collected at about 1,000 feet per minute and was drawn about 3.5 times its extruded length to produce a 70 denier yarn. A control yarn containing no antistatic agent was produced in the same manner as described above.

EXAMPLE 2

The 70 denier polycaproamide yarn containing an antistatic agent and the control yarn which was produced in Example 1 were woven into conventional plain weave fabrics. The yarns contained 1/2-Z twist. The fabrics were scoured in a conventional manner and then dyed scarlet in an aqueous dye bath containing Nylomine Acid Scarlet C3GS and Nylomine acid Yellow C3GS dyes using a conventional dyeing procedure. The fabric containing the antistatic agent dyed to substantially the same shade and had essentially the same hand as the polycaproamide fabric containing no antistatic agent. The presence of the antistatic agent also did not appreciably affect the dye lightfastness of the fabric.

The fabrics were cut into fabric test samples having a width of 3 inches and a length of 9 inches. The fabric samples were tested for their antistatic property in accordance with the general procedure described in the *Technical Manual of the American Association of Textile Chemists and Colorists*, 1969 Edition, Volume 45 at pages 206 through 207. This test procedure is entitled "Electrostatic Clinging of Fabrics: Fabric-to-Metal Test" and is numbered A.A.T.C.C. 115-1969.

The time for each fabric sample for decling completely of its own accord was recorded. Fresh test and rubbing fabrics were used for each determination and the fabric samples were tested in triplicate in both warp and filling directions with nylon and polyester rubbing fabrics. The averages of the test data collected are contained in Table I.

The fabric samples were subjected to repeated washings to evaluate the permanency of the antistatic property imparted by the antistatic agent. The fabrics were washed in a commercial washing machine having conventional washing and rinsing cycles at a temperature of about 70° C. using a conventional laundry detergent. The fabrics were then dried in a commercial drier at a temperature of about 80° C. for a period of time of about 30 minutes. Prior to testing, the fabric samples were pressed free of creases with a clean, dry iron at the appropriate settings and were then conditioned from the dry side at 20 percent relative humidity and a temperature of 24° C. for at least 24 hours (Technical Manual of the A.A.T.C.C., page B-124, paragraph 4.3, note 9.4).

The average times for each respective set of fabric samples to decling completely of their own accord after 0, and 25 wash cycles were contained in Table I. The antistatic measurements were made at 20 percent relative humidity and a temperature of 24° C. The percent relative humidity employed was 20 and not 40 as in the A.A.T.C.C. procedure.

EXAMPLE 3

The procedure of Example 1 is followed with a material of similar structure as that described except that the DMT/polyether mol ratio is 0.9, and melt viscosity is 7500 centipoises at 100° C. The results of the cling test are shown in Table I.

EXAMPLE 4

The procedure of Example 1 is followed with a material of similar structure as that described except that the DMT/polyether mol ratio is 1.0 and melt viscosity is about 17,500 centipoises at 100° C. The results of the cling test are shown in Table I.

EXAMPLE 5

A glass reactor equipped with a heater and stirrer was charged with a mixture of 1520 grams of e-caprolactam and 80 grams of aminocaproic acid. The mixture was then flushed with nitrogen and was stirred and heated to 255° C. over a 1 hour period at atmospheric pressure to produce a polymerization reaction. The heating and stirring was continued at atmospheric pressure under a nitrogen sweep for an additional four hours in order to complete the plymerization. During the last thirty minutes of the polymerization, 60 grams of the antistatic additive of Example 1 was added to the polycaproamide and stirring was continued to thoroughly mix the antistatic agent throughout the polymer. Nitrogen was then admitted to the glass reactor and a small pressure was maintained while the polymer was extruded from the glass reactor in the form of a polymer ribbon. The polymer ribbon was subsequently cooled, pelletized using a Wiley Mill, washed and then dried. The polymer was a white solid having a relative viscosity of about 55 to 60, as determined at a concentration of 11 grams of polymer in 100 ml. of 90 percent formic acid at 25° C. (ASTMD-789-62I).

The polycaproamide pellets containing the antistatic agent were melted at about 285° C. and then melt extruded under a pressure of 1500 psig through a 16-orifice spinnerette, each of the orifices having a diameter of 0.014 inch, to produce a 250 denier fiber. The fiber was collected at about 1,000 feet per minute and was drawn about 3.5 times its extruded length to produce a 70 denier yarn. A control yarn containing no antistatic agent was produced in the same manner as described above.

EXAMPLE 6

The procedure is that of Example 5 with the material as described in Example 3. The cling results are in Table I.

EXAMPLE 7

The procedure is that of Example 5 with the material of Example 4. The cling results are in Table I.

EXAMPLE 8

The procedure is that of Example 1 except that 90 grams of the additive described in Example 3 were used instead of 60 grams. Cling results are in Table I.

EXAMPLE 9

The procedure is that of Example 5 except that 90 grams of additive described in Example 3 is used. Cling results are in Table I.

EXAMPLE 10

A glass reactor equipped with a heater and stirrer was charged with a mixture of 1520 grams of e-caprolactam and 80 grams of aminocaproic acid. The mixture was then flushed with nitrogen and was stirred and heated to 255° C. over a 1 hour period at atmosphereic pressure to produce a polymerization reaction. The heating and stirring was continued at atmospheric pressure under a nitrogen sweep for an additional four hours in order to complete the polymerization. Nitrogen was then admitted to the glass reactor and a small pressure was maintained while the polymer was extruded from the glass reactor in the form of a polymer ribbon. At this time 90 grams of additive as described in Example 3 was mixed into the polymer by blending molten polymer and antistatic additive in a static mixer to produce a uniform dispersion of antistatic additive in the extrudate. The polymer ribbon was subsequently cooled, pelletized using a Wiley Mill, washed and then dried. The polymer was a white solid having a relative viscosity of about 50 to 60, as determined at a concentration of 11 grams of polymer in 100 ml. of 90 percent formic acid at 25° C. (ASTMD-789-62T).

The polycaproamide pellets containing the antistatic agent were melted at about 285° C. and then melt extruded under a pressure of 1500 psig through a 16-orifice spinnerette, each of the orifices having a diameter of 0.014 inch, to produce a 250 denier fiber. The fiber was collected at about 1,000 feet per minute and was drawn about 3.5 times its extruded length to produce a 70 denier yarn. A control yarn containing no antistatic agent was produced in the same manner as described above.

EXAMPLE 11

The procedure is that of Example 10 except that 112 grams were used. Cling results are in Table I.

EXAMPLE 12

The procedure was that of Example 1 except that 60 grams of an antistatic additive obtained from the reaction of Tetronic 1504 and methylene bis(4-cyclohexyl isocyanate) were used. This material has an ethylene oxide content of about 40% and a diisocyanate/-polyether mol ratio of 0.9. Cling results are in Table I.

EXAMPLE 13

The procedure is that of Example 1 but with the compound having a structure of Example 12 except 90 grams were used Cling results are in Table I.

EXAMPLE 14

The procedure is that of Example 10 but with the compound having the structure of Example 12 with 90 grams of additive. Cling results are in Table I.

EXAMPLE 15

The procedure is that of Example 1 except 60 grams of an antistatic material derived from the reaction of Tetronic 1504 and the diglycidyl ether of 2,2 bis(4-hydroxyphenyl) propane. This material had an ethylene oxide content of about 40% and a ratio of diglycidyl ether of 2,2-bis(4-hydroxyphenyl)-propane to polyether of 0.9. Cling results are in Table I.

EXAMPLE 16

The procedure is that of Example 15 except that 90 grams of the additive are used. Cling tests are in Table I.

EXAMPLE 17

The procedure is that of Example 10 and the additive is that of the structure shown in Example 15 except that 90 grams are used. Cling tests are in Table I.

EXAMPLE 18

The additive is similar to structure of Example 1 except that the total compound molecule has 60% ethylene oxide (Tetronic 1506). The additive (90 grams) charged in lactam as in Example 1. Cling tests are in Table I.

EXAMPLE 19

Procedure used is that of Example 10 (injected) with 90 grams of a product derived from Tetronic 1302 and DMT. Cling test results are shown in Table I.

EXAMPLE 20

Procedure used is that of Example 10 with 90 grams of a product derived from Tetronic 908 and DMT. Cling test results are shown in Table I.

EXAMPLE 21

Ninety-four parts of polyhexamethylene adipamide and six parts of the material of structure of Example 10 are melt blended by mixing the additive with the molten polyamide at about 285° C. The melt is extruded from a spinneret and the fibers are drawn and tested (see Table I).

TABLE I
Electrostatic Clinging of Fabrics
Fabric-to-Metal Test Results

Average Times for Fabric Samples to Decling from Metal Completely on Their Own Accord, Seconds

| Antistatic Agent in Fabric None | Unwashed 600+ | 25 Wash Cycles 600+ |
|---|---|---|
| Ex. 1 | 0 | 53 |
| 3 | 0 | 105 |
| 4 | 0 | 83 |
| 5 | 0 | 39 |
| 6 | 0 | 88 |
| 7 | 0 | 52 |
| 8 | 0 | 48 |
| 9 | 0 | 44 |
| 10 | 0 | 55 |
| 11 | 0 | 38 |
| 12 | 0 | 90 |
| 13 | 0 | 68 |
| 14 | 0 | 52 |
| 15 | 0 | 110 |
| 16 | 0 | 80 |
| 17 | 0 | 71 |
| 18 | 0 | 93 |
| 19 | 0 | 75 |
| 20 | 0 | 95 |
| 21 | 0 | 97 |
| 23 | 0 | 77 |
| 25 | ↓ | 50 |
| 26 | | 62 |
| 27 | ↓ | 52 |
| 28 | | 68 |
| 29 | ↓ | 46 |
| 30 | | 72 |
| 31 | ↓ | 83 |
| 32 | | 130 |
| 33 | ↓ | 86 |
| 34 | | 57 |
| 35 | ↓ | 85 |
| 36 | | 47 |
| 37 | ↓ | 150 |
| 38 | | 75 |
| 39 | ↓ | 210 |
| 40 | | 115 |
| 41 | ↓ | 79 |
| 42 | | 112 |
| 43 | ↓ | 97 |
| 44 | | 64 |
| 45 | ↓ | 85 |
| 46 | | 71 |
| 47 | ↓ | 110 |

TABLE I-continued
Electrostatic Clinging of Fabrics
Fabric-to-Metal Test Results Average Times for Fabric Samples to Decling from Metal Completely on Their Own Accord, Seconds

| Antistatic Agent in Fabric None | Unwashed 600+ | 25 Wash Cycles 600+ |
|---|---|---|
| 48 | | 89 |
| 49 | ↓ | 67 |
| 50 | | 51 |
| 51 | ↓ | 64 |
| 52 | | 45 |
| 53 | ↓ | 67 |
| 54 | | 52 |
| 55 | ↓ | 86 |
| 56 | | 50 |

EXAMPLE 22

The procedure of Example 9 was followed to prepare the polymer labeled "A" below. The procedure of Example 10 was followed to prepare to polymer labeled "B" below. The pellets of polymer containing the antistatic agent were prepared as follows for both polymer "A" and polymer "B". Pellets containing the antistatic agent were melted at about 285° C. and then melt extruded under pressure of 1500 psig to a 70 orifice spinnerette, each of the orifices having a diameter of 0.018 inch to produce a fiber having about 4500 denier. The fiber was collected at about 100 feet per minute and was drawn at about 4 times the extruded length to produce the yarn having a denier of about 1050. A control yarn containing no antistatic agents was prepared in the same manner as described above.

The yarns were textured using a steam jet and then two-plied by twisting two ends together with a 1½ "S" twist. The yarns were tufted into a level loop 20 oz. carpet at about a 6.5 stitch rate, about 9/32 to 10/32 inch pile height, dyed and latexed. Static buildup of the carpet was tested by measuring the electrostatic voltage buildup on a person walking with a series of steps on a piece of carpet according to the standard CRI Walk Test for static propensity in carpets, also labeled AATCC 134-1969. Carpet was conditioned at 70° F. at 20 percent relative humidity. Results are shown in the following Table.

| Polymer | Static Walk Test |
|---|---|
| Polymer A | 4.8 KV |
| Polymer B | 5.8 KV |
| Control Carpet | 14.1 KV |

The compounds used to prepare the antistatic agents of this invention are either commercially available or easily prepared from commercially available compounds by one skilled in the art.

Typical polyalkylenepolyamines and monoamines upon which the compounds about are based are given in the following examples.

| | | Summary of Antistatic Additive Examples | | | | |
|---|---|---|---|---|---|---|
| Example No. | Where Added | Polyether Branching Agent[a] | Polyether Chain Extender | Percent EO* In Additive | Chain Ext./ Polyether Mol Ratio | Percent Added |
| 23 | In lactam | TETA | None | 70 | — | 4 |
| 25 | In lactam | TETA | 4,4' methylenebis (cyclohexyl) isocyanate | 70 | 0.9 | 4 |
| 26 | Injected | TETA | 4,4' methylenebis | 70 | 0.9 | 4 |

-continued

Summary of Antistatic Additive Examples

| Example No. | Where Added | Polyether Branching Agent[a] | Polyether Chain Extender | Percent EO* In Additive | Chain Ext./ Polyether Mol Ratio | Percent Added |
|---|---|---|---|---|---|---|
| 27 | Injected | TETA | (cyclohexyl) isocyanate 4,4' methylenebis (cyclohexyl) isocyanate | 70 | 0.9 | 6 |
| 28 | In lactam | TETA | DMT[c] | 70 | 0.9 | 6 |
| 29 | Injected | TETA | DMT | 70 | 0.9 | 6 |
| 30 | In lactam | TETA | diglycidyl ether of 2,2-bis (4-hydroxy phenyl) propane | 70 | 0.9 | 4 |
| 31 | In lactam | TETA | diglycidyl ether of 2,2-bis (4-hydroxy phenyl) propane | 70 | 0.9 | 6 |
| 32 | Injected | TETA | diglycidyl ether of 2,2-bis (4-hydroxy phenyl) propane | 70 | 0.9 | 6 |
| 33 | In lactam | DETA | None | 40 | — | 4 |
| 34 | Injected | DETA | None | 40 | — | 4 |
| 35 | Injected | DETA | DMT | 40 | 0.9 | 6 |
| 36 | Injected | DETA | DMT | 60 | 0.9 | 6 |
| 37 | Injected | TETA | DMT | 40 | 0.9 | 6 |
| 38 | Injected | TEPA | None | 40 | — | 6 |
| 39 | Injected | TEPA | DMT | 40 | 0.9 | 6 |
| 40 | Injected | PEHA | None | 40 | — | 6 |
| 41 | Injected | PEHA | DMT | 40 | 0.9 | 6 |
| 42 | Injected into nylon 6,6 | TETA | DMT | 70 | 0.9 | 6 |
| 43 | Injected | MIBPA | None | 40 | — | 6 |
| 44 | Injected | MIBPA | DMT | 40 | 0.9 | 6 |
| 45 | Injected | Stearylamine | None | 40 | — | 6 |
| 46 | Injected | Stearylamine | DMT | 40 | 0.9 | 6 |
| 47 | Injected | R—C$_3$H$_6$NH$_2$ with H (R=stearyl) | None | 40 | — | 6 |
| 48 | Injected | RN—C$_3$H$_6$NH$_2$ with H (R=stearyl) | DMT | 40 | 0.9 | 6 |
| 49 | Injected | DAP | None | 40 | — | 6 |
| 50 | Injected | DAP | DMT | 40 | 0.9 | 6 |
| 51 | Injected | DMDETA | None | 40 | — | 6 |
| 52 | Injected | DMDETA | DMT | 40 | 0.9 | 6 |
| 53 | Injected | Polyoxypropylene diamine[b] | None | 40 | — | 6 |
| 54 | Injected | Polyoxypropylene diamine[b] | DMT | 40 | 0.9 | 6 |
| 55 | Injected | BAPP | None | 40 | — | 6 |
| 56 | Injected | BAPP | DMT | 40 | 0.9 | 6 |

*ethylene oxide
[a]TETA = triethylenetetramine
DETA = diethylenetriamine
TEPA = tetraethylenepentamine
PEHA = pentaethylenehexamine
MIBPA = methyliminobispropylamine
DAP = 1,4-diaminopiperazine
DMDETA = 1,4-dimethyl diethylenetriamine
BAPP = N,N'-bis(3-aminopropyl)piperazine

[b]polyoxypropylene diamine = 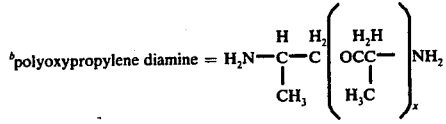

[c]= dimethylterephthalate

EXAMPLE 23

A glass reactor equipped with a heater and stirrer was charged with a mixture of 1520 grams of e-caprolactam, 80 grams of aminocaproic acid and 60 grams of an antistatic additive obtained by the reaction of triethylene tetramine with propylene oxide (PO) then ethylene oxide (EO) to form an EO/PO block copolymer containing 70% EO in the molecule. The additive is soluble in water and toluene and has a molecular weight of 34,000 and a melt viscosity of 1750 centipoises at 100° C. The mixture was then flushed with nitrogen and was stirred and heated to 255° C. over a 1 hour period at atmospheric pressure to produce a polymerization reaction. The heating and stirring was continued at atmospheric pressure under a nitrogen sweep for an additional 3 hours in order to complete the polymerization.

Nitrogen was then admitted to the glass reactor and a small pressure was maintained while the polymer was extruded from the glass reactor in the form of a polymer ribbon. The polymer ribbon was subsequently cooled, pelletized using a Wiley Mill, washed and then dried. The polymer was a while solid having a relative viscosity of about 55 to 60, as determined at a concentration of 11 grams of polymer in 100 ml. of 90 percent formic acid at 25° C (ASTMD-789-62T).

The polycaproamide pellets containing the antistatic agent were melted at about 285° C. and then melt extruded under a pressure of 1500 psig through a 16-orifice spinnerette, each of the orifices having a diameter of 0.014 inch, to produce a 250 denier fiber. The fiber was collected at about 1,000 feet per minute and was drawn about 3.5 times its extruded length to produce a 70 denier yarn. The yarns contained 1/2Z twist. A control yarn containing no antistatic agent was similarly produced as described above. Electrostatic cling tests were conducted according to Example 24 and the results are shown in Table I.

EXAMPLE 24

The 70 denier polycaproamide yarn containing an antistatic agent and the control yarn which was produced in Example 23 were each woven into conventional plain weave fabrics. The fabrics wete scoured in a conventional manner and then dyed scarlet in an aqueous dye bath containing Nylomine Acid Scarlet C3GS and Nylomine Acid Yellow C3GS dyes using a conventional dyeing procedure. The fabric containing the antistatic agent dyed to substantially the same shade and had essentially the same hand as the polycaproamide fabric containing no antistatic agent. The presence of the antistatic agent also did not appreciably affect the dye lightfastness of the fabric.

The fabrics were cut into fabric test samples having a width of 3 inches and a length of 9 inches. The fabric samples were tested for their antistatic property in accordance with the general procedure described in the *Technical Manual of the American Association of Textile Chemists and Colorists,* 1969 Edition, Volume 45 at pages 206 and 207. This test procedure is entitled "Electrostatic Clinging of Fabrics: Fabric-to-Metal Test" and is numbered A.A.T.C.C. 115-1969.

The time for each fabric sample to decling completely of its own accord was recorded. Fresh test and rubbing fabrics were used for each determination and the fabric samples were tested in triplicate in both warp and filling directions with a polyester rubbing fabric. The averages of the test data collected are contained in Table I below.

The fabric samples were subjected to repeated washings to evaluate the permanency of the antistatic property imparted by the antistatic agent. The fabrics were washed in a commercial washing machine having conventional washing and rinsing cycles at a temperature of about 70° C. using a conventional laundry detergent. The fabrics were then dried in a commercial drier at a temperature of about 80° C. for a period of time of about 30 minutes. Prior to testing, the fabric samples were pressed free of creases with a clean, dry iron at the appropriate settings and were then conditioned from the dry side at 20 percent relative humidity and a temperature of 24° C. for at least 24 hours (see *Technical Manual of the A.A.T.C.C.,* Vol. 45, page 207, paragraph 4.3, note 9.5).

The average times for each respective set of fabric samples to decling completely of their own accord after 0 and 25 wash cycles are contained in Table I below. The antistatic measurements were made at 20 percent relative humidity and a temperature of 24° C. The percent relative humidity employed was 20 and not 40 as in the A.A.T.C.C. procedure.

EXAMPLE 25

The procedure of Example 23 is followed using 60 grams of a chain-extended antistatic additive. This addition is one obtained by reaction of the polyether antistatic additive of Example 1 with compound 4,4'-methylene bis (cyclohexyl) isocyanate in a polyether:isocyanate mol ratio of 1:0.9. This product is soluble in water and toluene, is fusible and has a melt viscosity of 4100 centipoises at 100° C. The fibers were processed as in Example 24 and cling results are in Table I.

EXAMPLE 26

A glass reactor equipped with a heater and stirrer was charged with a mixture of 1520 grams of e-caprolactam and 80 grams of aminocaproic acid. The mixture was then flushed with nitrogen and was stirred and heated to 255° C. over a 1 hour period at atmospheric pressure to produce a polymerization reaction. The heating and stirring was continued at atmospheric pressure under a nitrogen sweep for an additional 4 hours in order to complete the polymerization.

Nitrogen was then admitted to the reactor and a small pressure was maintained while the polymer was extruded from the reactor in the form of a polymer ribbon. At this time 60 grams of the additive described in Example 25 was mixed into the polymer by blending molten polymer and antistatic additive in a static mixer to produce a uniform dispersion of antistatic additive in the extrudate.

The polymer ribbon was subsequently cooled, pelletized using a Wiley Mill, washed and then dried. The polymer was a white solid having a relative viscosity of about 55 to 60, as determined at a concentration of 11 grams of polymer in 100 ml. of 90 percent formic acid at 25° C. (ASTMD-789-62T).

The polycaproamide pellets containing the antistatic agent were melted at about 285° C. and then melt extruded under a pressure of 1500 psig through a 16-orifice spinnerette, each of the orifices having a diameter of 0.014 inch, to produce a 250 denier fiber. The fiber was collected at about 1,000 feet per minute and was drawn about 3.5 times its extruded length to produce a 70 denier yarn with a ½-Z twist. The fibers were processed as in Example 24 and cling results are shown in Table I.

EXAMPLE 27

The procedure is that of Example 26 except that 90 grams of the additive described in Example 25 were used Cling results are shown in Table I.

EXAMPLE 28

The procedure of Example 23 is followed except that 90 grams of additive are used. The additive is obtained by reaction of the polyether additive described in Example 23 with dimethyl terephthalate instead of the isocyanate in a polyether:DMT mol ratio of 1:0.9. This additive is a soluble, fusible solid melt viscosity 4000 centipoises at 100° C. Cling results are in Table I.

EXAMPLE 29

The procedure of Example 26 is used and 90 grams of additive described in Example 28 are used. Cling results are in Table I.

EXAMPLE 30

The procedure of Example 23 is used and 60 grams of additive are used. The additive is obtained by reaction of the polyether of Example 23 and diglycidyl ether of 2,2-bis(4-hydroxyphenyl)propane in a mol ratio of polyether:epoxy compound of 1:0.9. The product is soluble and fusible. Cling results are in Table I.

EXAMPLE 31

The procedure of Example 23 and 90 grams of the additive of Example 30 are used. The results are shown in Table I.

EXAMPLE 32

The procedure of Example 26 is used with 90 grams of the additive of Example 30. Cling results are in Table I.

EXAMPLE 33

The procedure is that of Example 23 except 60 grams of a different additive were used. The additive is based on diethylene triamine which was propoxylated then ethoxylated to give a EO/PO block copolymer containing 40% ethylene oxide in the molecule. The additive is fusible, solid soluble in water, alcohol and toluene and had a molecular weight of 16,000. The cling test is in Table I.

EXAMPLE 34

The procedure of Example 26 is followed with 60 grams of the additive of Example 33. Cling test results are in Table I.

EXAMPLE 35

The procedure of Example 26 is followed with 90 grams of additive. The additive is product obtained by reaction of the polyether of Example 33 and DMT in a polyether:DMT mol ratio of 1:0.9. The product obtained is fusible and soluble in water and toluene. Cling tests are in Table I.

EXAMPLE 36

Procedure is that of Example 26 with 90 grams of product similar to that of Example 35 except that the additive had a total of 60% EO in the molecule. The product was reacted with DMT in a polyether:DMT mol ratio of 1:0.9 to give a fusible, water and toluene soluble product. Cling test results are in Table I.

EXAMPLE 37

Procedure is that of Example 26, with additive similar to that in Example 29 except the polyether had 40% EO in the molecule. Ninety grams was used. Cling test results are in Table I.

EXAMPLE 38

Procedure is that of Example 26, with additive similar to that in Example 33 except the EO/PO block copolymer type polyether is based on tetraethylene pentamine and contains 40% ethylene oxide. It is a fusible solid, soluble in water or toluene having a molecular weight 22,000. Ninety grams are used. Cling test results are in Table I.

EXAMPLE 39

Procedure is that of Example 26, with additive is the polyether of Example 38 chain-extended with DMT, at a 1:0.9 mol ratio polyether to DMT. The product is a fusible, soluble solid. Cling test results are in Table I.

EXAMPLE 40

Procedure is that of Example 26, with a different additive which is a EO/PO block copolymer type polyether based on pentaethylenehexamine and contains 40% ethylene oxide in the molecule. The product is a fusible, soluble material with molecular weight of 25,000. Ninety grams of additive were used. Cling tests are in Table I.

EXAMPLE 41

Procedure is that of Example 26 with additive is the polyether of Example 40 which is chain-extended with DMT at a 1:0.9 polyether:DMT mol ratio. The additive is a fusible, soluble solid. Ninety grams of additive are used. Cling test results are in Table I.

EXAMPLE 42

Procedure and additive are similar to Example 29 except the nylon was nylon 6,6 polymerized from poly(hexamethylammonium) adipate salt. Ninety grams of additive were used. Cling test results are in Table I.

EXAMPLE 43

Procedure is that of Example 26 with 90 grams of additive which is an EO/PO block copolymer, with 40% EO in the molecule, based on methyliminobispropylamine. The fusible, soluble material has a molecular weight of 13,000. For cling test results, see Table I.

EXAMPLE 44

Procedure is that of Example 26 with 90 grams of additive as described in Example 43 which was subsequently chain-extended with DMT at a 1:0.9 polyether:DMT mol ratio to yield a fusible, soluble solid. For cling test see Table I.

EXAMPLE 45

Procedure is that of Example 26 with 90 grams of additive which is an EO/PO block copolymer of stearylamine with 40% EO in the molecule and a molecular weight of 7000. For cling test see Table I.

EXAMPLE 46

Procedure is that of Example 26 with additives which is that of Example 45, but subsequently chain-extended with DMT at a 1:0.9 polyether:DMT mol ratio. The product is a fusible and soluble solid. Ninety grams of additive were used. For cling test see Table I.

EXAMPLE 47

Procedure is that of Example 26 with 90 grams of an EO/PO block copolymer based on N-stearyl 1,3-propanediamine containing 40% ethylene oxide in the molecule and having a molecular weight of 10,000. Cling tests are in Table I.

EXAMPLE 48

Procedure is that of Example 26 with additive of Example 47 which was subsequently chain-extended with DMT at a 1:0.9 polyether:DMT mol ratio to give a fusible, soluble solid. Ninety grams of additive were used. For cling test see Table I.

EXAMPLE 49

Procedure is that of Example 26, with 90 grams of additive which is an EO/PO block copolymer based on 1,4-diamino piperazine containing 40% EO in the molecule and having a molecular weight of 13,000. For cling test see Table I.

EXAMPLE 50

Procedure is that of Example 26 with additive of Example 49 which is chain-extended with DMT at a 1:0.9 polyether:DMT mol ratio to give a soluble, fusible additive. Ninety grams of additive were used. For cling test see Table I.

EXAMPLE 51

Procedure is that of Example 26 with 90 grams of additive which is an EO/PO block copolymer based on 1,4-dimethyl diethylenetriamine, containing 40% EO in the molecule. For cling test see Table I.

EXAMPLE 52

Procedure is that of Example 26 with additive of Example 51 which was chain-extended with DMT at a 1:0.9 polyether:DMT mol ratio to yield a fusible soluble material. Ninety grams of additive were used. For cling test see Table I.

EXAMPLE 53

Procedure is that of Example 26 with 90 grams of additive which is a EO/PO block copolymer based on polyoxypropylenediamine of molecular weight 230, containing 40% EO in the molecule. For cling test see Table I.

EXAMPLE 54

Procedure is that of Example 26, additive of Example 53 which was chain-extended with DMT at a 1:0.9 polyether:DMT mol ratio to give a fusible soluble additive. Ninety grams of additive were used. For cling test see Table I.

EXAMPLE 55

Procedure is that of Example 26 with 90 grams of an additive which is an EO/PO block copolymer based on N,N'-bis(3-aminopropyl)piperazine. The additive contained 40% EO in the molecule. For cling test see Table I.

EXAMPLE 56

Procedure is that of Example 26 with additive of Example 55 which was chain-extended with DMT at a 1:0.9 polyether:DMT mol ratio to yield a fusible soluble material.

We claim:

1. An antistatic polyamide fiber, said fiber containing between about 1 percent and 12 percent by weight of at least one reaction product of a diepoxide with a branched alkylene amine having a molecular weight above 1,500 said amine selected from the group consisting of compounds represented by the formulas:

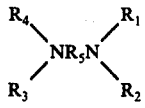  (A)

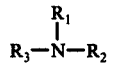  (B)

where $R_1$, $R_2$, $R_3$ and $R_4$ are independently selected from monovalent hydrocarbon radicals having 1 to 20 carbon atoms derived from aliphatic, aromatic, cycloaliphatic, aromatic-aliphatic, heterocyclic hydrocarbons or $-(C_rH_{2r}O)_m(C_pH_{2p}O)_q-H$; $R_5$ is at least one of the alkylene difunctional radicals having 2 to 15 carbon atoms and a radical selected from

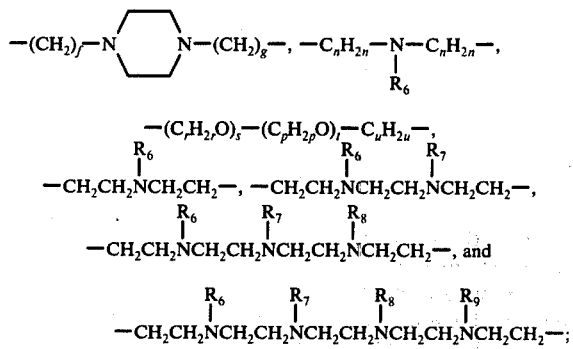

$R_6$, $R_7$, $R_8$ and $R_9$ are independently selected from $R_1$, $R_2$, $R_3$, $R_4$, H or another monovalent hydrocarbon radical having 1 to 20 carbon atoms as defined for $R_1$, $R_2$, $R_3$ and $R_4$, provided that at least one of $R_1$, $R_2$, $R_3$ and $R_4$, $R_6$, $R_7$, $R_8$, or $R_9$ is $-(C_rH_{2r})_m(C_pH_{2p}O)_q-H$, where n is 3 to 6; $r$, $p$ and $u$ are 2, 3, or 4; $s$, $t$, $m$, $q$ are 0 to 100; $m + q$ must be $> 5$; $s$ and $t$ must be $< 100$; $f$, $g$ are 0 or 2 to 6; were $j$ and $k$ are each 1 to 250, and said diepoxide being reactive with the end of the moiety $-(C_rH_{2r}O)_m(C_pH_{2p}O)_q-H$ and yieldig a difunctional chain extending radical, said reaction product being predominantly branched, the mole ratio of said diepoxide to said amine (A) and/or (B) being from about 0.7/1.0 to 1.0/1.0

2. The antistatic fiber of claim 1 wherein $R_5$ is a radical derived from a compound selected from the group consisting of triethylenetetramine, diethylenetriamine, tetraethylenepentamine, pentaethylenehexamine, methyliminobispropylamine, 1,4-diaminopiperazine, 1,4-dimethyldiethylenetriamine, N,N'-bis(3-aminopropylpiperazine), or polyoxypropylenediamine.

3. The antistatic fiber of claim 1 wherein at least one but not all $R_1$, $R_2$, $R_3$, $R_4$, $R_6$, $R_7$, $R_8$, and $R_9$ are

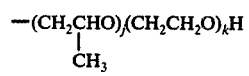

and $R_5$ is a radical derived from a compound selected from the group consisting of triethylenetetramine, diethylenetriamine, tetraethylenepentamine, pentaethylenehexamine, methyliminobispropylamine, 1,4-diaminopiperazine, 1,4-dimethyl diethylenetriamine, N,N'-bis(3-aminopropylpiperazine), or polyoxypropylenediamine.

4. The polyamide fiber of claim 1 wherein the ethylene oxide moieties make up about 10 percent to about 90 percent of the molecular weight of said compound and the fiber contains between about 2 percent to about 10 percent of said compound.

5. In a method of preparing an antistatic polyamide fiber, said fiber containing between about 1 percent and about 12 percent by weight, comprising uniformly dispersing an antistatic additive in the fiber-forming polymer, then forming the fiber by conventional methods, the improvement consisting of using for the antistatic additive about 1 to 12 percent by weight of at least one reaction product of a diepoxide with a branched alkylene amine having a molecular weight above 1,500, said amine selected from the group consisting of compounds represented by the formulas

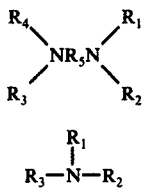

(A)

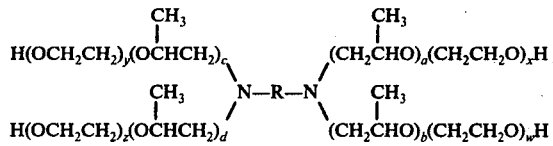

(B)

$R_3-\underset{R_1}{\underset{|}{N}}-R_2$ where $R_1$, $R_2$, $R_3$ and $R_4$ are independently selected from monovalent hydrocarbon radicals having 1 to 20 carbon atoms derived from aliphatic, aromatic, cycloaliphatic, aromatic-aliphatic, heterocyclic hydrocarbons or $-(C_rH_{2r}O)_m(C_pH_{2p}O)_q-H$; $R_5$ is at least one of the alkylene difunctional radicals having 2 to 15 carbon atoms and a radical selected from

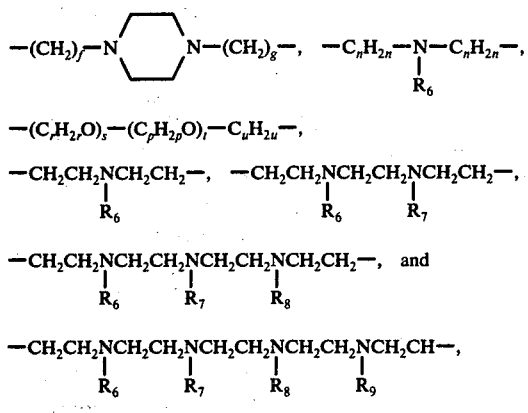

$R_6$, $R_7$, $R_8$, and $R_9$ are independently selected from $R_1$, $R_2$, $R_3$, $R_4$, H or another monovalent hydrocarbon radical having 1 to 20 carbon atoms as defined for $R_1$, $R_2$, $R_3$ and $R_4$, where $n$ is 3 to 6; $r$, $p$ and $u$ are 2, 3, or 4; $s$, $t$, $m$, $q$ are 0 to 100; $m + q$ must be $> 5$; $s$ and $t$ must be $< 100$; $f$, $g$ are 0 or 2 to 6; $j$ and $k$ are 1 to 250; where $R_{10}$ is a divalent radical having 1 to 20 carbon atoms derived from aliphatic, aromatic, cycloaliphatic, aromaticaliphatic, or heterocyclic hydrocarbons, said reaction product being predominantly branched, the mol ratio of said diepoxide to said amine (A) and/or (B) being about 0.7/1.0 to 1.0/1.0.

6. The method of claim 5 where the polymer is polyamide, the ethylene oxide moieties make up about 10 percent to about 90 percent of the molecular weight of said compound, and said compound is added in an amount between about 2 percent and about 10 percent by weight.

7. The method of claim 6 wherein $R_1$ and $R_3$ are a monovalent hydrocarbon radical containing 3 to 6 carbon atoms or $-(C_rH_{2r}O)_m-(C_pH_{2p}O)_q-H$ and R is a radical derived from a compound selected from the group consisting of triethylenetetramine, diethylenetriamine, tetraethylenepentamine, pentaethylenehexamine, methyliminobispropylamine, 1,4-diaminopiperazine, 1,4-dimethyldiethylenetriamine, N,N'-bis-(3-aminopropylpiperazine), or polyoxypropylenediamine.

8. An antistatic polyamide fiber, said fiber containing between about 1 percent and about 12 percent by weight of a predominantly branched, chain-extended polymer of the reaction product of a compound represented by the formula:

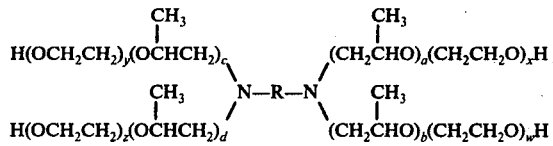

where a, b, c, d, w, x, y, and z are each a whole number and R is a difunctional radical from a hydrocarbon containing 2 to 13 carbon atoms and a diepoxide.

9. The antistatic fiber of claim 8 wherein R is a difunctional radical from a lower alkyl aliphatic hydrocarbon compound containing 1 to 6 carbon atoms.

10. The polyamide fiber of claim 9 wherein the ethylene oxide moieties make up about 10 percent to about 90 percent of the molecular weight of said compound and the fiber contains between about 2 percent to about 10 percent of said compound.

11. In a method of preparing an antistatic polyamide fiber, said fiber containing between about 1 percent and about 12 percent by weight, comprising uniformly dispersing an antistatic additive in the fiber-forming polymer, then forming the fiber by conventional methods, the improvement consisting of using for the antistatic additive about 1 to 12 percent by weight of a predominantly branched, chain-extended polymer of the reaction product of a compound represented by the formula

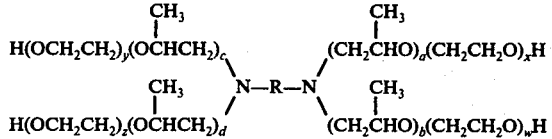

where a, b, c, d, w, x, y, and z are each a whole number and r is a difunctional radical from a hydrocarbon containing 1 to 13 carbon atoms, and a diepoxide.

12. The method of claim 11 where the polymer is polyamide, the ethylene oxide moieties make up about 10 percent to about 90 percent of the molecular weight of said compound, and said compound is added in an amount between about 2 percent and about 10 percent by weight.

13. The method of claim 12 where R is a difunctional radical from a lower alkyl aliphatic hydrocarbon containing 1 to 6 carbon atoms.

14. An antistatic fiber forming polyamide composition containing between about 1 percent and about 12 percent by weight based on the weight of the polyamide, of the polymeric reaction product of
A. an alkoxylated branched amine compound having a molecular weight of at least 1,650 derived from
an organic amine compound having at least one primary amino group
reacted with
at least one alkylene oxide having 2 to 3 carbon atoms
with
B. an diepoxide the mol ratio of said compound B to said compound A being from about 0.7/1.0 to 1.0/1.0.

* * * * *